United States Patent
Lin et al.

(10) Patent No.: US 11,221,546 B2
(45) Date of Patent: Jan. 11, 2022

(54) LENS AND PROJECTION DEVICE

(71) Applicant: QISDA CORPORATION, Taoyuan (TW)

(72) Inventors: Chien-Hung Lin, Taoyuan (TW); Tzu-Huan Hsu, Taoyuan (TW); Sheng-Wen Hu, Taoyuan (TW); Hsin-Jung Yeh, Taoyuan (TW); Chih-Chieh Tsung, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/858,694

(22) Filed: Apr. 26, 2020

(65) Prior Publication Data

US 2020/0379323 A1 Dec. 3, 2020

(51) Int. Cl.
  *G03B 21/14* (2006.01)
  *G02B 9/06* (2006.01)
  *G03B 21/16* (2006.01)

(52) U.S. Cl.
  CPC ............ *G03B 21/142* (2013.01); *G02B 9/06* (2013.01); *G03B 21/145* (2013.01); *G03B 21/16* (2013.01)

(58) Field of Classification Search
  None
  See application file for complete search history.

(56) References Cited

U.S. PATENT DOCUMENTS

| 4,893,111 A * | 1/1990 | Roller | B60Q 1/26 |
| | | | 315/200 A |
| 2017/0242324 A1* | 8/2017 | Kuroda | H04N 9/3144 |

FOREIGN PATENT DOCUMENTS

| CN | 101726819 A | 6/2010 |
| CN | 203287677 U | 11/2013 |
| JP | H10-82936 A * | 3/1998 |

* cited by examiner

*Primary Examiner* — Michelle M Iacoletti
*Assistant Examiner* — Danell L Owens

(57) ABSTRACT

A lens includes a casing, a first lens group, a second lens group and a heat dissipating member. The first lens group is disposed in the casing and close to a first side of the casing. The second lens group is disposed in the casing and close to a second side of the casing, wherein the first side is opposite to the second side. The heat dissipating member is disposed at the second side of the casing and contacts the casing.

4 Claims, 6 Drawing Sheets

LENS AND PROJECTION DEVICE

BACKGROUND OF THE INVENTION

1. Field of the Invention

The invention relates to a lens and a projection device and, more particularly, to a lens capable of dissipating heat from a lens group close to an optical engine effectively and a projection device equipped with the lens.

2. Description of the Prior Art

Recently, projectors are getting more and more popular. With the capacity of video playing, projectors are applied not only for common office meetings, but also for various seminars or academic courses. In general, a lens of a projector may comprise a front lens group and a rear lens group, wherein the front lens group is relatively far from an optical engine and the rear lens group is relatively close to the optical engine. Since the optical engine generates a large amount of heat during operation, the temperature of the rear lens group close to the optical engine is relatively high. If the heat cannot be dissipated in time, a focal length of the rear lens group may be affected by thermal deformation and then thermal drift may occur.

SUMMARY OF THE INVENTION

An objective of the invention is to provide a lens capable of dissipating heat from a lens group close to an optical engine effectively and a projection device equipped with the lens, so as to solve the aforesaid problems.

According to an embodiment of the invention, a lens comprises a casing, a first lens group, a second lens group and a heat dissipating member. The first lens group is disposed in the casing and close to a first side of the casing. The second lens group is disposed in the casing and close to a second side of the casing, wherein the first side is opposite to the second side. The heat dissipating member is disposed at the second side of the casing and contacts the casing.

According to another embodiment of the invention, a projection device comprises an optical engine and a lens. The optical engine comprises a housing and a micromirror device. The micromirror device is disposed in the housing. The lens comprises a casing, a first lens group, a second lens group and a heat dissipating member. The first lens group is disposed in the casing and close to a first side of the casing. The second lens group is disposed in the casing and close to a second side of the casing, wherein the first side is opposite to the second side. The heat dissipating member is disposed at the second side of the casing and contacts the casing. The optical engine is disposed with respect to the second side of the casing.

As mentioned in the above, the invention disposes the heat dissipating member at the second side of the casing and the heat dissipating member contacts the casing, wherein the second side of the casing is close to the optical engine. Accordingly, the heat of the second lens group close to the optical engine (i.e. close to the second side of the casing) can be dissipated by the heat dissipating member, such that the temperature can be reduced. After the projection device operates for a span of time, a focal length of the second lens group will not be affected by thermal deformation, such that thermal drift can be avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
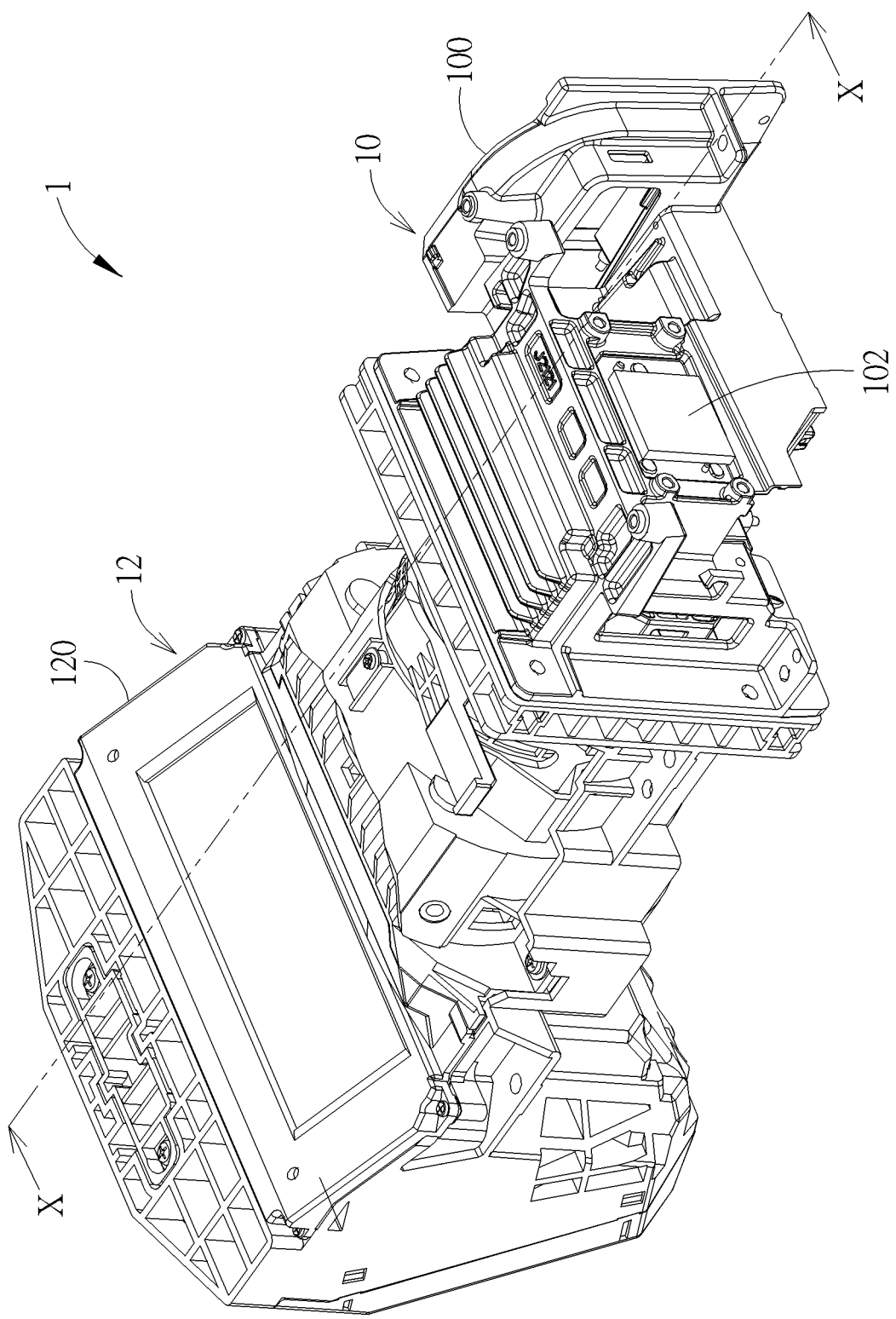
FIG. 1 is a perspective view illustrating a projection device according to an embodiment of the invention.
Figure 2:
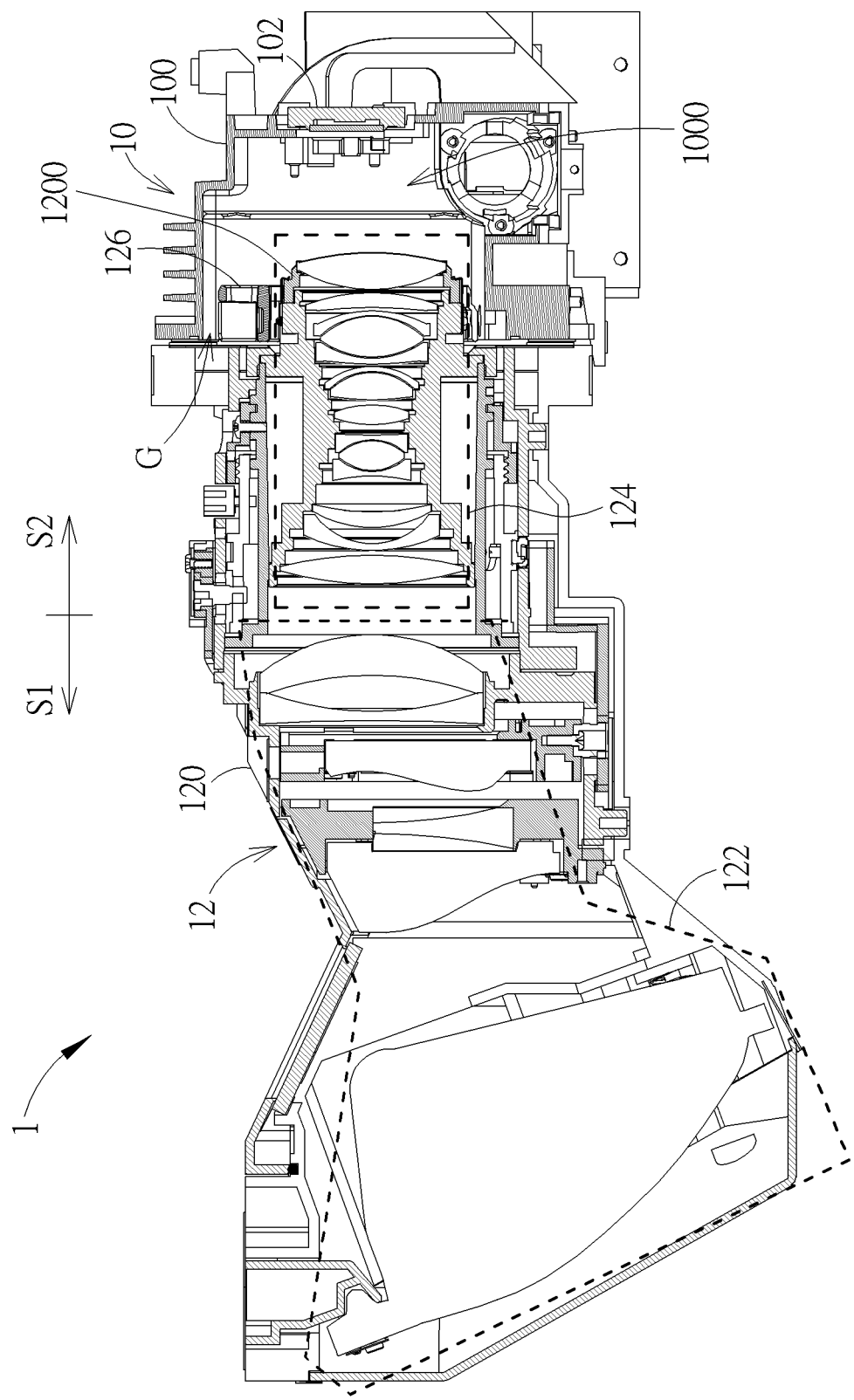
FIG. 2 is a sectional view illustrating the projection device along line X-X shown in FIG. 1.
Figure 3:
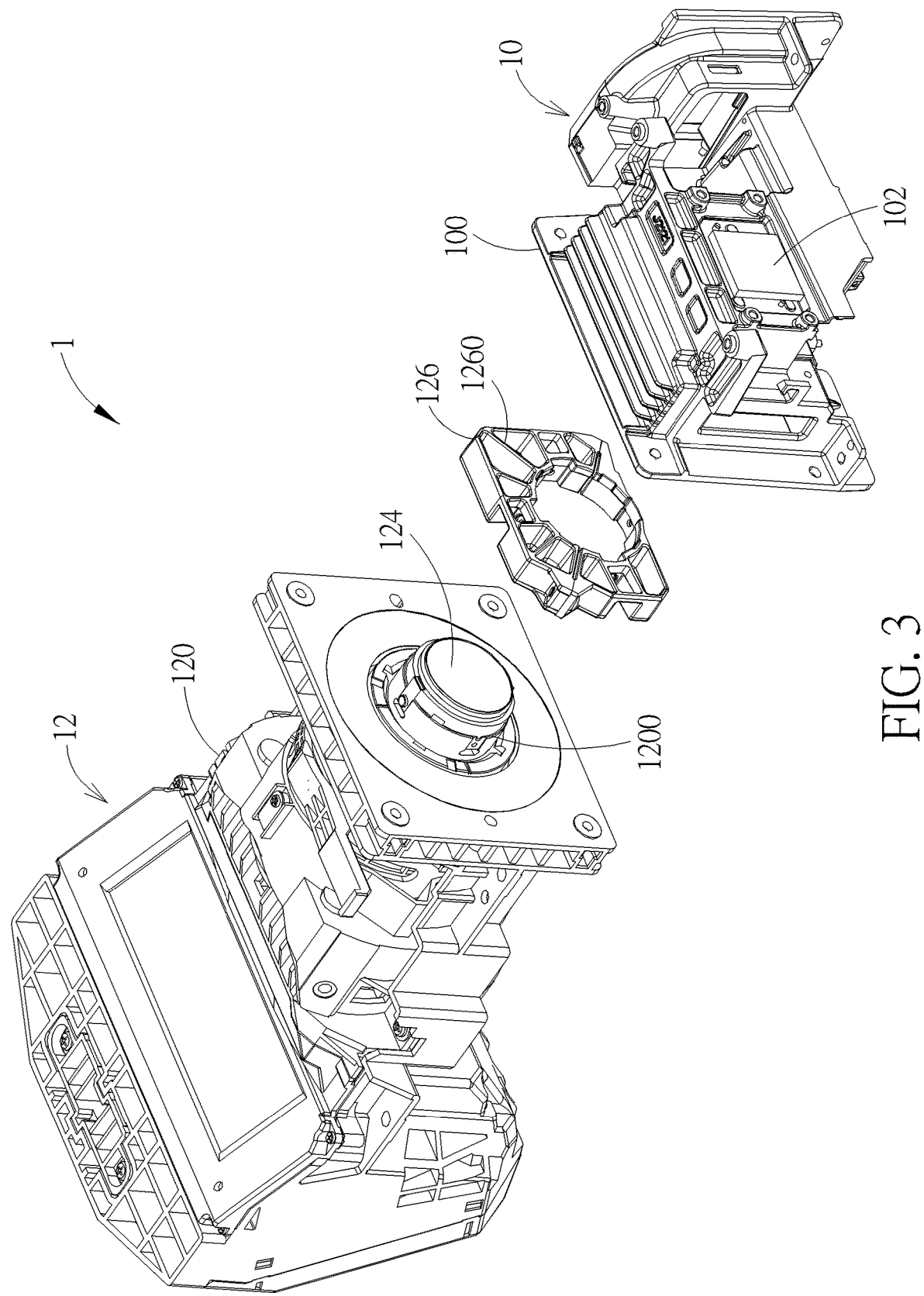
FIG. 3 is an exploded view illustrating the projection device shown in FIG. 1.
Figure 4:
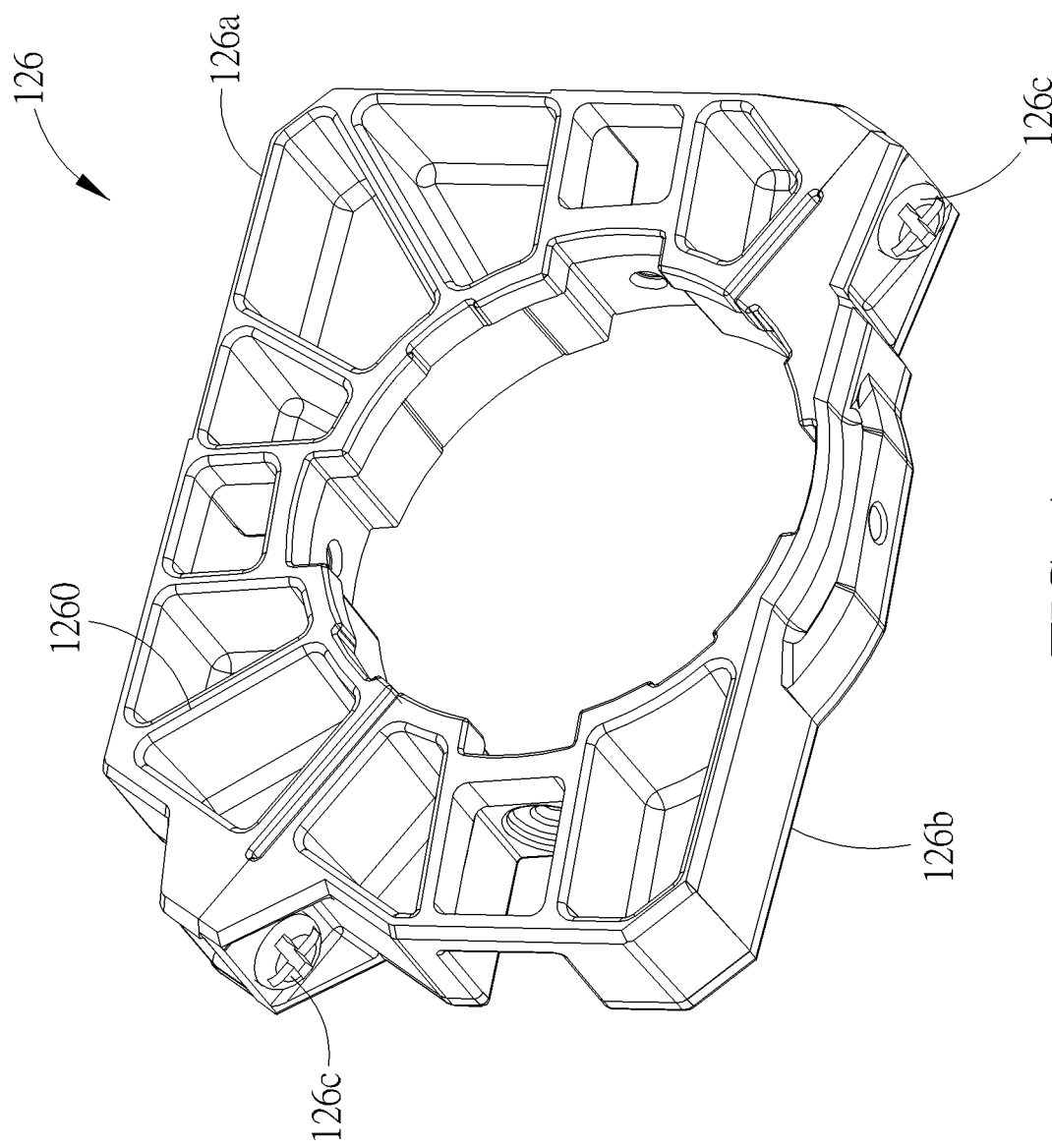
FIG. 4 is a perspective view illustrating the heat dissipating member shown in FIG. 3 from another viewing angle.
Figure 5:
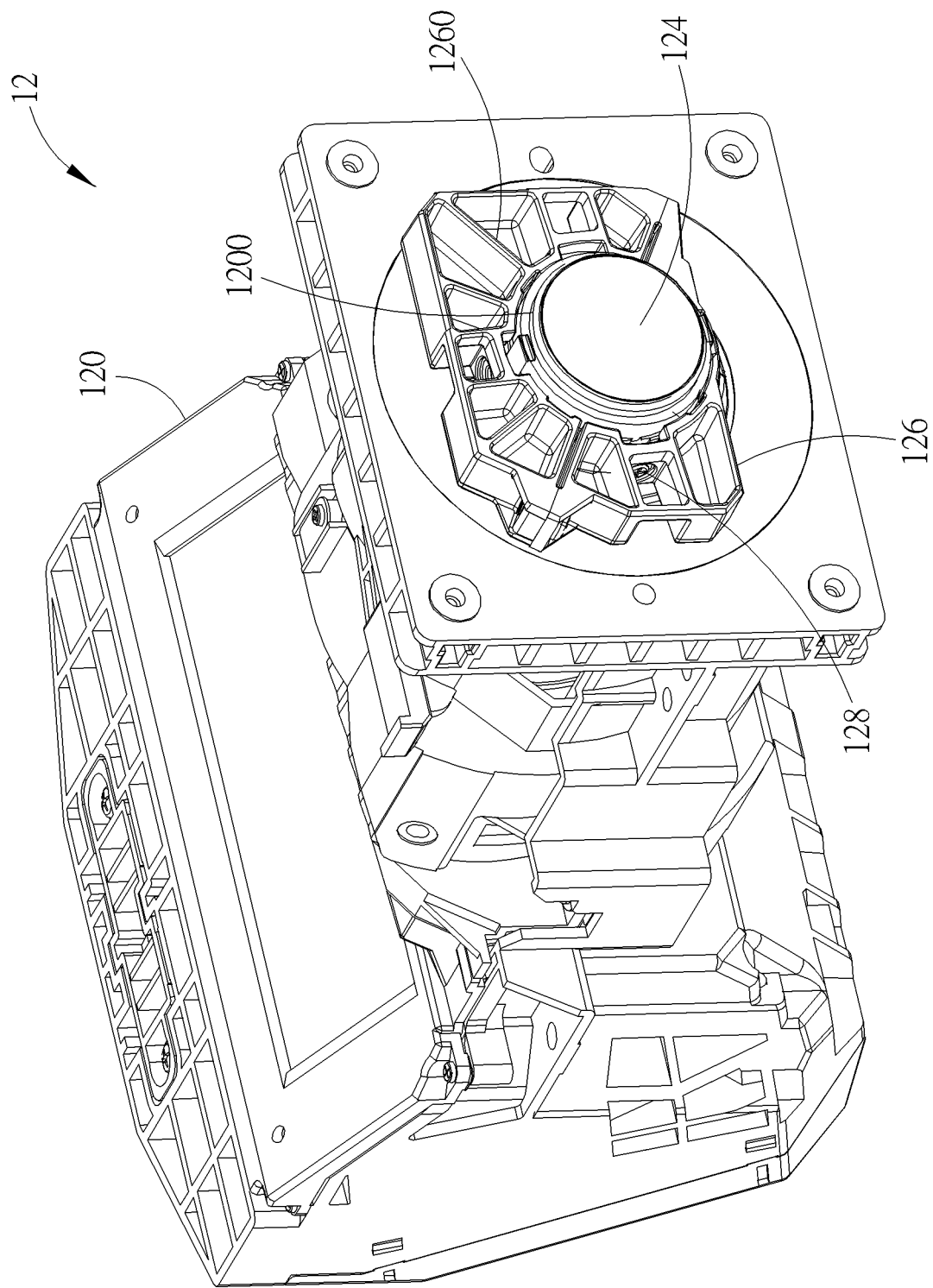
FIG. 5 is an assembly view illustrating the heat dissipating member assembled to the casing shown in FIG. 3.
Figure 6:
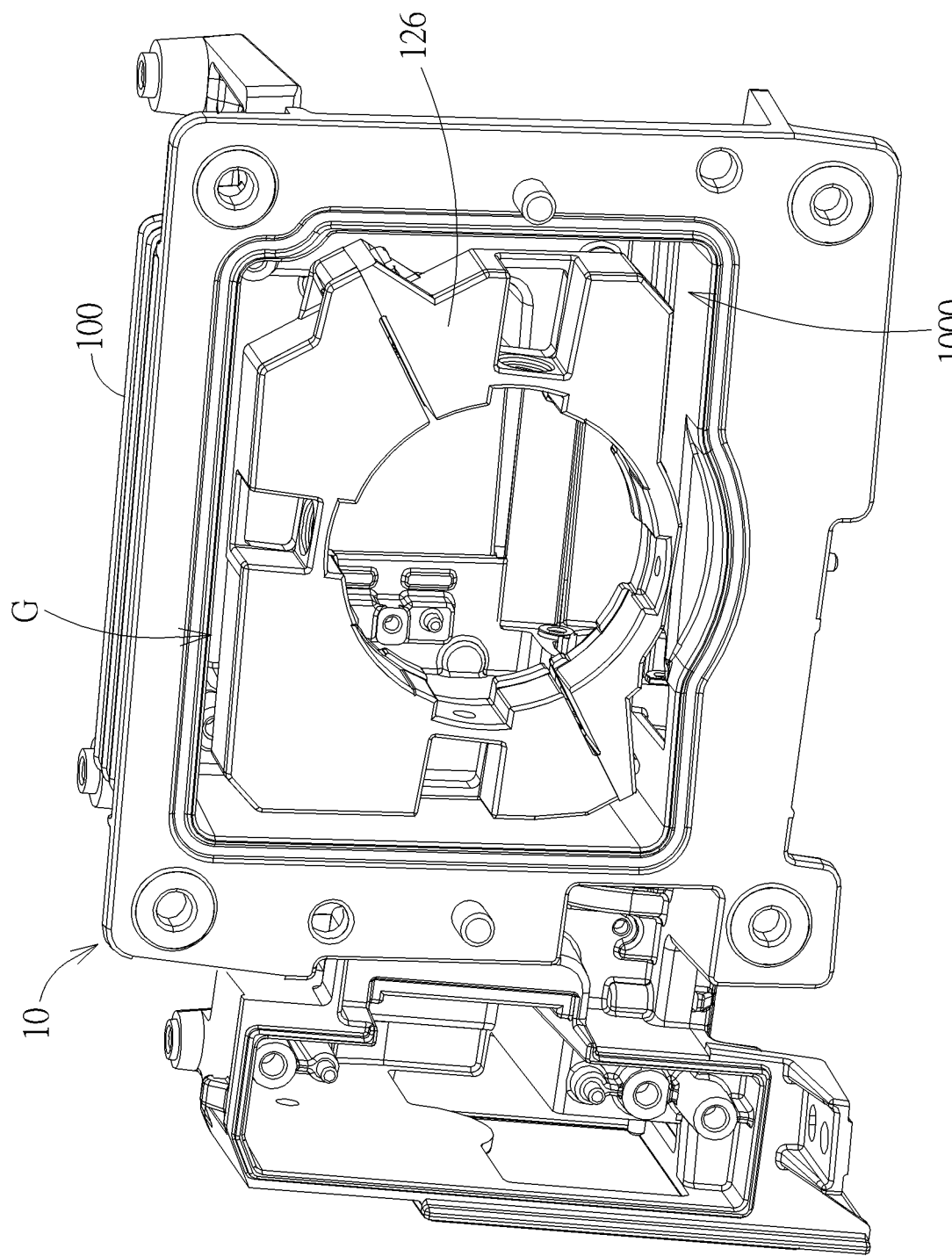
FIG. 6 is a perspective view illustrating the heat dissipating member located in the housing of the optical engine shown in FIG. 3.

Referring to FIGS. 1 to 6, FIG. 1 is a perspective view illustrating a projection device 1 according to an embodiment of the invention, FIG. 2 is a sectional view illustrating the projection device 1 along line X-X shown in FIG. 1, FIG. 3 is an exploded view illustrating the projection device 1 shown in FIG. 1, FIG. 4 is a perspective view illustrating the heat dissipating member 126 shown in FIG. 3 from another viewing angle, FIG. 5 is an assembly view illustrating the heat dissipating member 126 assembled to the casing 120 shown in FIG. 3, and FIG. 6 is a perspective view illustrating the heat dissipating member 126 located in the housing 100 of the optical engine 10 shown in FIG. 3.

As shown in FIGS. 1 to 3, the projection device 1 comprises an optical engine 10 and a lens 12. The projection device 1 may be applied to a projector. In general, the projector may further comprise a light source, wherein the light source is configured to emit light and the light is processed by the optical engine 10 and then projected to form an image through the lens 12. It should be noted that the principle of the projector is well known by one skilled in the art, so the repeated explanation will not be depicted herein again.

The optical engine 10 comprises a housing 100 and a micromirror device 102, wherein the micromirror device 102 is disposed in the housing 100. In practical applications, the micromirror device 102 may be a digital micromirror device (DMD).

The lens 12 comprises a casing 120, a first lens group 122, a second lens group 124 and a heat dissipating member 126. The casing 120 may be divided into a first side S1 and a second side S2, wherein the first side S1 is opposite to the second side S2. The first lens group 122 and the second lens group 124 are disposed in the casing 120, wherein the first lens group 122 is close to the first side S1 of the casing 120 and the second lens group 124 is close to the second side S2 of the casing 120. In this embodiment, the optical engine 10 is disposed with respect to the second side S2 of the casing 120. Accordingly, the first lens group 122 is relatively far from the optical engine 10 and the second lens group 124 is relatively close to the optical engine 10. Furthermore, the first lens group 122 and the second lens group 124 may consist of a plurality of lenses, wherein the number of the lenses may be determined according to practical applications.

The heat dissipating member 126 is disposed at the second side S2 of the casing 120 and contacts the casing 120. In this embodiment, the second side S2 of the casing 120 may have a protruding portion 1200 and a part of the second lens group 124 is located in the protruding portion 1200. When the heat dissipating member 126 is disposed at the second side S2 of the casing 120, the heat dissipating member 126 surrounds the protruding portion 1200 and the heat dissipating member 126 may contact the casing 120 tightly, so as to improve heat dissipation. In this embodiment, as shown in FIG. 4, the heat dissipating member 126 may comprise two half ring-shaped members 126a, 126b and two fixing members 126c (e.g. screws), wherein the two half ring-shaped members 126a, 126b may be fixed with each other by the two fixing members 126c, so as to form the heat dissipating member 126. Furthermore, as shown in FIG. 5, the heat dissipating member 126 may be fixed on the protruding portion 1200 of the second side S2 of the casing 120 by a fixing member 128 (e.g. screw).

In this embodiment, the casing 120 may be made of plastic material and the heat dissipating member 126 may be made of metal material. Accordingly, the heat of the second lens group 124 close to the second side S2 of the casing 120 (i.e. close to the optical engine 10) can be dissipated by the heat dissipating member 126, such that the temperature can be reduced. After the projection device 1 operates for a span of time, a focal length of the second lens group 124 will not be affected by thermal deformation, such that thermal drift can be avoided.

In this embodiment, the lens 12 may further comprise a thermal interface material (e.g. thermal pad) disposed between the heat dissipating member 126 and the protruding portion 1200 of the casing 120, so as to improve heat dissipation. The heat dissipating member 126 may have a plurality of heat dissipating fins 1260 and the heat dissipating fins 1260 are arranged radially, so as to increase heat dissipating area.

Still further, as shown in FIGS. 2 and 6, the housing 100 of the optical engine 10 has an accommodating recess 1000. After the projection device 1 is assembled, the protruding portion 1200 of the casing 120 and the heat dissipating member 126 are disposed in the accommodating recess 1000 of the housing 100 of the optical engine 10. At this time, a gap G exists between the heat dissipating member 126 and an inner wall of the accommodating recess 1000. That is to say, the heat dissipating member 126 does not contact the inner wall of the accommodating recess 1000. Accordingly, the invention can prevent the heat generated by the optical engine 10 from being conducted to the lens 12.

As mentioned in the above, the invention disposes the heat dissipating member at the second side of the casing and the heat dissipating member contacts the casing, wherein the second side of the casing is close to the optical engine. Accordingly, the heat of the second lens group close to the optical engine (i.e. close to the second side of the casing) can be dissipated by the heat dissipating member, such that the temperature can be reduced. After the projection device operates for a span of time, a focal length of the second lens group will not be affected by thermal deformation, such that thermal drift can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection device comprising:
   an optical engine comprising a housing and a micromirror device, the micromirror device being disposed in the housing, and the housing having an accommodating recess; and
   a lens comprising a casing, a first lens group, a second lens group and a heat dissipating member, the first lens group being disposed in the casing and close to a first side of the casing, the second lens group being disposed in the casing and close to a second side of the casing, the first side being opposite to the second side, the heat dissipating member being disposed at the second side of the casing and contacting the casing, the optical engine being disposed with respect to the second side of the casing, the second side of the casing having a protruding portion, a part of the second lens group being located in the protruding portion, the heat dissipating member surrounding the protruding portion, the protruding portion and the heat dissipating member being disposed in the accommodating recess, and a gap existing between the heat dissipating member and an inner wall of the accommodating recess.

2. The projection device of claim 1, wherein the lens further comprises a thermal interface material disposed between the heat dissipating member and the protruding portion.

3. The projection device of claim 1, wherein the casing is made of plastic material and the heat dissipating member is made of metal material.

4. The projection device of claim 1, wherein the heat dissipating member has a plurality of heat dissipating fins and the heat dissipating fins are arranged radially.

* * * * *